United States Patent [19]

Van Eenam

[11] 4,226,957
[45] Oct. 7, 1980

[54] WET STRENGTH PAPER ADDITIVES

[75] Inventor: Donald N. Van Eenam, Des Peres, Mo.

[73] Assignee: Monsanto Company, St. Louis, Mo.

[21] Appl. No.: 48,218

[22] Filed: Jun. 13, 1979

[51] Int. Cl.$^2$ ............................ C08F 8/32; C08F 8/24
[52] U.S. Cl. ........................... 525/336; 260/29.2 EP; 260/29.6 HN; 427/326; 525/359; 526/75; 526/346; 526/347.1
[58] Field of Search ................. 525/336, 359; 526/75; 260/29.6 HN, 29.2 EP

[56] References Cited

U.S. PATENT DOCUMENTS

| | | | |
|---|---|---|---|
| 3,988,503 | 10/1976 | Arujoshi et al. | 525/336 |
| 4,087,599 | 5/1978 | Roe et al. | 525/359 |
| 4,096,133 | 6/1978 | Zwergle | 525/336 |
| 4,129,528 | 12/1978 | Petrovich et al. | 260/29.2 EP |

*Primary Examiner*—William F. Hamrock
*Attorney, Agent, or Firm*—David Bennett; William J. Farrington; Edward P. Grattan

[57] ABSTRACT

A polymer is described which has particular utility as an additive imparting wet and dry strength to a paper base. The polymer is formed by the reaction of a polymer of an N,N-disubstituted vinyl-benzyl amine or homologue thereof with an epihalohydrin.

5 Claims, No Drawings

WET STRENGTH PAPER ADDITIVES

BACKGROUND OF THE INVENTION

This invention relates to wet and dry strength additives for use with paper and particularly to additives derived from the condensation of an aromatic polymer having a plurality of pendant amine groups, with an epihalohydrin.

As is well known, untreated paper, when wet, becomes exceedingly soft and tends to fall apart as the fibers of the paper lose interfiber bonding. To combat this tendency it has been found expedient to add to the paper a polymer that will adhere to the fibers and bond them together at the points where the fibers are in contact. The polymers help the paper to maintain its structure even when wet and are said therefore, to confer "wet strength".

There are a number of polymers that have been employed for this purpose but probably the most successful have been those produced by the reaction of a polyamine with an epihalohydrin. This invention falls into this category but represents an advance in the art in terms of its superior hydrolytic stability, high polymer yield, efficiency of usage of the relatively expensive epihalohydrin and amine monomer reactants and very fast cure to produce the strengthened paper.

DISCUSSION OF THE PRIOR ART

A number of patents have issued which describe generally the reaction of a polyamine with epihalohydrin to produce resinous wet strength additives.

The polymers described in U.S. Pat. Nos. 3,700,623; 3,833,531 and 3,840,504 are polymers or copolymers of diallylamine which, when reacted with epihalohydrin, yield adequate wet strength resins.

Canadian Pat. No. 776,566 describes wet strength additives which are copolymers of epihalohydrin with the reaction product of iminobispropylamine and a dihaloalkane. Such additives however, tend to gel very readily, have a relatively poor shelf life and give modest wet strength properties.

The polymeric additives of the present invention while formed by the reaction of tertiary amine groups with epihalohydrin molecules are quite distinct from the disclosures contained in the prior art and represent a high yield route to the production of a highly efficient wet and dry strength additive.

SUMMARY OF THE INVENTION

The present invention provides a polymeric additive suitable for conferring wet strength on a cellulosic substrate wherein from 5 to 100% of the recurring units have the formula:

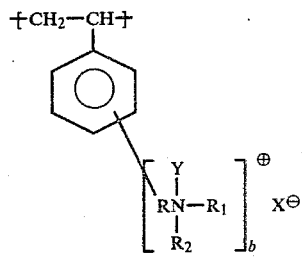

Y is selected from

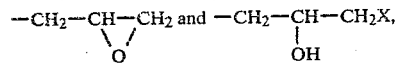

X is a radical derived from a water-soluble proton acid, R is a $C_1$ to $C_3$ alkylene group, $R_1$ and $R_2$ are each substituted or unsubstituted $C_1$ to $C_4$ alkyl groups or, taken with the nitrogen, together represent a saturated heterocyclic group, and b is an integer from 1 to 3.

The polymeric additive of the invention is preferably obtained by the reaction of a vinyl polymer wherein from 5 to 100% of the recurring units have the formula:

with an epihalohydrin at a pH of about 6.5 to 9.5 and a temperature of 0°–80° C. and thereafter stabilizing the reaction product using a water soluble proton acid HX.

As indicated below the above vinyl polymer tertiary amine is usually generated by neutralization of a corresponding quaternary amine salt using an alkali.

The invention further comprises a process for improving the wet strength of a fibrous cellulosic substrate which comprises treating the substrate with up to 15 and preferably from 2 to 10 kilos of the polymeric additive of the invention for every metric ton of the substrate.

The polymeric additive is obtained in the form of an aqueous solution and is stabilized in that state by addition of a water soluble proton acid that is an acid comprising an anion and at least one proton, such as for example, hydrochloric acid, hydrobromic acid, sulphuric acid, nitric acid, phosphoric acid, formic acid or acetic acid. The amount of acid added is preferably enough to adjust the pH to a value of 1 to 5 and in practice this requires from about 0.3 to 1.2 equivalents of the acid per equivalent of epihalohydrin in the polymeric additive.

The vinyl polymer itself is usually prepared by polymerization of a water-soluble salt of the monomer in the presence of any desired comonomer, in aqueous solution using a suitable free radical initiator such as ammonium persulfate, t-butyl hydroperoxide or di-t-butyl peroxide at a temperature of from about 50° to 150° C. and a pH of 5.0 or lower.

Alternatively, a vinyl benzyl alkyl halide monomer can be polymerized or copolymerized under similar conditions and the resultant polymer may then be reacted with an excess of the appropriate amine. This is a less preferred method since it can lead to undesirable cross-linking.

This vinyl polymer may then be reacted directly with the epihalohydrin without being first isolated or purified though it is sometimes preferred to generate the pure vinyl polymer by separating it from the salt forming protons and conjugate anions. This separation is often desirable when the acid salt is derived from a hydrohalic acid since the halide ion competes with the amine in the reaction with epihalohydrin. This competition produces undesirable by-products and reduces the efficiency with which the epihalohydrin is used. It is found however, that when a non-hydrohalic acid having a pKa less than 3, (such as sulfuric acid) is used such side reactions are minimized.

The vinyl monomer used in the present invention is preferably one in which R is a methylene group and $R_1$ and $R_2$ are each either methyl or ethyl groups. The group R can however, be an ethylene or a propylene group and $R_1$ and $R_2$ can separately be methyl, ethyl, propyl, butyl, 2-hydroxyethyl, 3-cyanopropyl, chloromethyl, or 2-bromo-ethyl, for example, or taken together can form with the nitrogen atom a saturated cyclic structure such as a morpholine or a piperidine ring.

The aromatic ring of the vinyl polymer can be substituted with up to three of the tertiary amine groups but in practice, unless the substituent groups on the nitrogen atoms are made small, steric factors make it difficult to position three such groups around the ring. In preferred polymeric additives the aromatic radical bears a single tertiary amine radical.

The vinyl monomer is preferably prepared by the reaction of an aromatic vinyl alkyl halide with a suitable amine. The number of alkyl substituents and the nature of the amine structure and its functionality will, of course, depend on the desired vinyl monomer to be produced.

A homopolymer of the vinyl monomer is very frequently preferred but it is understood that up to 95% of the vinyl monomer units can be replaced by copolymerizable monomers such as styrene, acrylic acid, acrylates and methacrylates, acrylamide, acrylonitrile, vinyl acetate, vinyl ethers, vinyl ketones, vinyl sulfonamide, N-methyl diallylamine, aminoalkyl acrylates and the like.

Additionally, the comonomer can be based on the same polyvinyl benzyl moiety, but bearing, in place of the tertiary amine radical, a quaternized amine using a methosulfate, alkyl halide or 2-hydroxyl-alkyl radical for example, or a sulfonium or a phosphonium radical salt.

The polymer is a wet strength additive and this implies that it can be adhered to a substrate and develop effective crosslinks on curing. Any comonomer therefore should be selected so as not to frustrate these ends.

In preparing the homopolymers, copolymers and interpolymers for use in this invention, reaction can be initiated by a redox catalytic system. In a redox system, the catalyst is "activated" or "triggered" by means of a reducing agent which promotes free radical formation without the use of heat. Reducing agents commonly used are sodium metabisulfite and potassium metabisulfite. Other reducing agents include water-soluble thiosulfates and bisulfites, hydrosulfites and reducing salts such as the sulfate of a metal which is capable of existing in more than one valence state such as cobalt, iron, manganese and copper. A specified example of such a sulfate is ferrous sulfate. The use of a redox initiator system has several advantages, the most important of which is efficient polymerization at lower temperatures. Conventional peroxide catalysts such as tertiary butyl hydroperoxide, potassium persulfate, hydrogen peroxide, and ammonium persulfate used in conjunction with the above reducing agents or metal activators, can be employed.

The epihalohydrin which is reacted with the polyamine can be any epihalohydrin, i.e., epihalohydrin, epibromohydrin, epifluorohydrin, or epidohydrin and is preferably epichlorohydrin. In general, the epihalohydrin is used in an amount ranging from about 0.5 mole to about 1.3 moles and preferably about 0.8 mole to about 1.2 moles per mole of secondary plus tertiary amine present in the polymer; secondary amine functionalities are generally only present at impurity levels or as comonomers with the vinyl benzyl dialkyl amine.

The resinous reaction products of the invention can be prepared by reacting the vinyl polymer based polyamine with an epihalohydrin at a temperature of from about 0° C. to about 80° C. and preferably from about 10° C. to about 60° C. until the viscosity measured on a solution containing 20% to 30% solids at 25° C. has reached a range of A to E and preferably about C to D on the Gardner-Holt scale. The reaction is preferably carried out in aqueous solution to moderate the reaction, and at a pH of from about 7 to about 9.5. When the desired viscosity is reached, sufficient water is added to adjust the solids content of the resin solution to about 20 to 25% or less and the product cooled to room temperature (about 25° C.). The resin solution can be used as such or, if desired, can be adjusted to a pH of at least about 5 and preferably to a pH of below about 4–5. Any suitable acid such as hydrochloric, sulfuric, nitric, formic, phosphoric and acetic acid can be used to adjust the pH.

The aqueous resin solutions can be applied to paper or other felted cellulosic products by tub application or by spraying, if desired. Thus, for example, preformed and partially or completely dried paper can be impregnated by immersion in, or spraying with, an aqueous solution of the resin, following which the paper can be heated for about 0.5 minutes to 30 minutes at temperatures of 90° C. to 100° C. or higher to dry same and cure the resin to a water-insoluble condition. The resulting paper has greatly increased wet and dry strength, and therefore this method is well suited for the impregnation of paper such as wrapping paper, paper bagging and the like, to impart both wet and dry strength characteristics thereto.

The preferred method of incorporating these resins in paper, however, is by internal addition prior to sheet formation, whereby advantage is taken of the substantivity of the resins for hydrated cellulosic fibers. In practicing this method, an aqueous solution of the resin in its uncured and hydrophilic state is added to an aqueous suspension of paper stock in the heater, stock chest, Jordan engine, fan pump, head box or at any other suitable point ahead of sheet formation. The sheet is then formed and dried in the usual manner.

The "off-the-machine" wet strength obtained with the resins of the invention will be satisfactory for most applications. Additional wet strength can be obtained by subjecting the paper to a heat treatment. Satisfactory temperatures will be of the order of from about 90° C. to about 130° C. for a period of time from about 0.5 to 60 minutes, time varying inversely with temperature. Further improvement of the resin efficiency can be obtained by reactivation of the aqueous acid stabilized resin solution using sodium or potassium hydroxide whereby halohydrin groups are dehydrohalogenated to produce epoxy groups which can undergo further cross-linking.

While the reaction products herein described impart substantial wet strength to paper they also improve the dry strength of paper by as much as 30% or more when present in relatively small amounts, i.e., about 2 or more, based on the dry weight of the paper. Generally, it will be desirable to use from about 1–4% by weight, based on the dry weight of the paper. However, amounts up to 7.5% or more by weight, based on the dry weight of the paper, can be used if desired.

The following Examples illustrate the invention. All percentages are by weight unless otherwise indicated.

EXAMPLE 1

This Example illustrates the method used to obtain the vinyl polymer hydrochloride salt.

An Ar-vinylbenzyl chloride monomer with a 60:40 ratio of meta:para isomers was reacted with an excess of 40% aqueous dimethylamine initially at 0°–5° C. then, following a gradual warmup, at room temperature to give a 93.1% yield of distilled vinyl benzyl dimethylamine (VBDA). Assay of the product by meq/g titrimetric analysis showed 96.6% purity.

An equivalent of hydrochloric acid was added cold to convert the amine monomer to the hydrochloride salt (VBDA.HCl).

The VBDA.HCl was then charged, as a 30% solution, together with 5.0 g. of ammonium persulfate per equivalent of the monomer into a reaction vessel and the reaction mixture was first sparged and then blanketed with nitrogen. The reaction temperature was raised and maintained at 75° C. and polymerization was allowed to proceed for 4 hours. During the reaction the pH fell from an initial 5.0 to 1.33. A 30% solution of the resultant polymer had a Gardner viscosity of I and the monomer to polymer conversion, calculated gravimetrically after double precipitation from acetone to remove monomer salt and initiator residue, was found to be 100% or essentially quantitative.

EXAMPLE 2

This Example describes the production of the vinyl polymer sulfate salt.

A solution of 96.74 g of VBDA monomer (0.6 mole) in 171.8 g of water was treated with 88.6 g of dilute sulfuric acid (96% acid and water in 1:2 volume ratio giving approximately 0.6 equivalents of hydrogen ion).

An initiator solution comprising 0.9 g of ammonium persulfate in 13.8 g of deionized water was prepared. This solution plus all of the VBDA.salt monomer solution were added through separate addition funnels, over a period of 2 hours, to a four-necked reaction vessel containing a solution of 0.9 g of ammonium persulfate and 25.0 g of 99% AR isopropyl alcohol, (chain transfer agent), in 25.0 g of deionized water. The reaction mixture was maintained at 75° C. with stirring under a blanket of nitrogen. After completion of the addition the reaction vessel was maintained at 75° C. with stirring for an additional hour before being allowed to cool.

The Gardner viscosity of the resin solution was G at a total solids of 30.64%. The pH at 25° C. was 2.68.

The monomer/polymer conversion, measured as in Example 1 was 101% of theory.

EXAMPLES 3–12

The following Examples illustrate the production of wet strength resins by the reaction of the vinyl polymers of Examples 1 and 2 and epichlorohydrin (EPI) in various ratios.

In each Example the reaction between the vinyl polymer salt and the EPI was preceded by neutralization of the salt with sufficient 2.0% aqueous sodium hydroxide to give an initial pH of about 7.5.

The essential reaction parameters and conditions are set forth in Table I below.

TABLE I

| SYNTHETIS PARAMETERS AND REACTION CONDITIONS | | | | | | | | | | |
|---|---|---|---|---|---|---|---|---|---|---|
| | Vinyl Polymer Example 1 (Anion $Cl^-$) | | | | | Vinyl Polymer Example 2 (Anion $SO_4^=$) | | | | |
| | Ex. 3 | Ex. 4 | Ex. 5 | Ex. 6 | Ex. 7 | Ex. 8 | Ex. 9 | Ex. 10 | Ex. 11 | Ex. 12 |
| Neutralization, Equiv. % Added NaOH ① | 18.0 | 18.0 | 18.0 | 18.0 | 18.0 | 18.0 | 18.0 | 18.0 | 18.0 | 18.0 |
| Initial Solution pH ② | 7.50 | 5.61 | 7.53 | 7.58 | 7.63 | 7.61 | 7.62 | 7.60 | 7.64 | 7.59 |
| E/A Level ③ | 1.00 | 0.85 | 0.70 | 0.55 | 1.20 | 0.85 | 0.70 | 0.55 | 1.00 | 1.20 |
| Run Conc., % ④ | 18.4 | 20.0 | 20.0 | 20.0 | 25.0 | 20.0 | 20.0 | 20.0 | 25.0 | 25.0 |
| Run Temperature °C. ⑨ | 10;→30 | | | | 10;-23.4 | | | 10;→30 | | |
| NaOH eq. % ⑤ | — | — | — | — | — | 3.0 | 3.0 | 9.0 | 37.5 | 43.8 |
| Run Time, Hours | 3:50 | 4:00 | 3:45 | 4:00 | 17.10 | 5:00 | 5:15 | 5:45 | 6:15 | 24:00 |
| Total Solids, % | 18.74 | 20.87 | 20.56 | 20.97 | 25.06 | 20.53 | 20.57 | 20.89 | 22.44 | 25.09 |
| Viscosity (Gardner) ⑥ | A/A+ | D−/D | C | C | B+ | B+ | E | E | E | E |
| pH at 25°C. | 3.82 | 2.56 | 2.13 | 1.56 | 2.11 | 3.05 / 2.32 | 2.17 | 2.12 | 2.21 | |
| Polymer Yield, % ⑦ | 101.7 | 103.3 | 100.8 | 101.9 | 99.1 | 101.4 | 100.9 | 102.0 | 103.2 | 100.5 |
| DCP, % at T.S. % ⑧ | 0.766 | 0.459 | 0.338 | 0.244 | 1.827 | 0.226 | 0.043 | 0.055 | 0.297 | 1.088 |
| EPI Conv., % ⑪ | 90.3 | 93.3 | 94.9 | 95.5 | 84.9 | 96.9 | 99.3 | 98.9 | 96.5 | 90.1 |
| "Effective" E/A ⑩ | 0.90 | 0.79 | 0.66 | 0.53 | 1.02 | 0.82 | 0.70 | 0.54 | 0.97 | 1.08 |

① on amine monomer unit equivalents charged.
② prior to epi addition.
③ epi added over 1.0 min. to stirred, aqueous polyamine solution. E/A computed as moles epi/amine monomer unit equivalents charged in vinyl polymer.
④ [Total organics + Na + ion charged/polymer solution Wt.] (100)
⑤ Added NaOH equivalents (per amine eq. charged) required to build solution viscosity, added incrementally at 3–7 eq. % during latter stages or run.
⑥ @ T. S. found.
⑦ (Experimentally determined total solids/theoretical total "solids" charged) (100).
⑧ Via GLC analytical method employing 1.000% cyclopentan-one in water as the internal standard.
⑨ initially 10° C., gradually raised to the higher temperature, then held to reaction completion and acid short-stopped.
⑩ (Epi conversion %/100 (E/A).
⑪ (% DCP at % T.S. found/100) (polymer prep. wt., g) (0.7173) = wt. of unconverted epi.
[Epi charged − unconverted Epi/Epi charged] (100) − Epi conv. %.

EXAMPLES 13–23

These Examples show the cured and uncured wet tensile strengths of papers treated with the additives prepared as described in Examples 3–12.

In each Example a pulp slurry of a 50/50 blend of bleached hardwood and bleached softwood Kraft fibers with a pH of 7.0 and a Canadian Standard Freeness of 452 was prepared. To measured aliquot samples of this slurry were added, with stirring, measured amounts of one of the polymers produced in Examples 3 to 12. Prior to addition to the pulp slurry the polymers were activated by the addition, over a period of 15 seconds, of 7.0 meq of 25% aqueous sodium hydroxide per gram of resin solids. The mixture was stirred throughout the addition and was then allowed to stand at room temperature for one minute before being diluted to 1.2% concentration by addition of more deionized water.

Enough of the polymer was added to correspond to application levels of 2.5, 5.0 and 7.5 kilos per metric ton, i.e. 0.25%, 0.5% and 0.75% of dry paper weight respectively.

The treated fibers were formed into a wet laid web with a press consistency of 35.2% and dried for 2 minutes at 95° C. The resulting 2.5 g×20.3×20.3 mm sheets were cut into 2.5 cm×20.3 cm strips and tested for tensile strength in an Instron Tensile Tester. Half of each group of samples was tested after being cured for 15 minutes at 90° C., and then wetted for 10 minutes. The other half omitted the curing process.

The results are set forth in Table II below. The "comparative" run shows the wet tensile strength of a similar paper strip without any wet strength additive added.

TABLE II

WET TENSILE STRENGTH DATA

| Example | Polymeric Additive from Example | Wet Tensile Strength, g/cm (Instron) | | | | | |
|---|---|---|---|---|---|---|---|
| | | 2.5 kilos/metric ton | | 5.0 kilos/metric ton | | 7.5 kilos/metric ton | |
| | | Uncured | Cured | Uncured | Cured | Uncured | Cured |
| 13 | 3 | 457 | 527 | 480 | 588 | 543 | 616 |
| 14 | 4 | 418 | 484 | 489 | 570 | 541 | 602 |
| 15 | 5 | 363 | 418 | 436 | 489 | 484 | 548 |
| 16 | 6 | 307 | 359 | 389 | 461 | 439 | 516 |
| 17 | 7 | 473 | 579 | 541 | 654 | 559 | 643 |
| 18 | 8 | 430 | 502 | 493 | 593 | 527 | 618 |
| 19 | 9 | 379 | 438 | 463 | 532 | 514 | 559 |
| 20 | 10 | 318 | 371 | 439 | 489 | 498 | 529 |
| 21 | 11 | 455 | 534 | 534 | 618 | 579 | 648 |
| 22 | 12 | 420 | 522 | 532 | 584 | 586 | 682 |
| 23 | | | | Comparative 25 | | | |

EXAMPLES 24–34

These Examples show the dry tensile strength of paper treated with the polymeric additives of Examples 3 to 12.

The testing procedure is the same as that used for the wet strength tensile testing except that the paper strips were conditioned under standard CTH conditions before being tested.

The results are given in Table III below. The "comparative" run shows the dry tensile strength of a similar untreated strip.

TABLE III

DRY TENSILE STRENGTH DATA
(5.0 kilos/metric ton Addition Level)

| Example | Additive from Example | Dry Tensile Strength* gm/cm | % of Control |
|---|---|---|---|
| 24 | 3 | 2629 | 127 |
| 25 | 4 | 2786 | 132 |
| 26 | 5 | 2625 | 125 |
| 27 | 6 | 2572 | 122 |
| 28 | 7 | 2750 | 131 |
| 29 | 8 | 2786 | 132 |
| 30 | 9 | 2572 | 122 |
| 31 | 10 | 2661 | 126 |
| 32 | 11 | 2643 | 125 |
| 33 | 12 | 2750 | 131 |
| | Comparative | 2107 | (100) |

*Average of 8 pulls (Instron)

The above results from Tables II and III indicate that the polymeric additives of the invention have excellent wet and dry strength properties. It is also significant that the cure that occurs is remarkably rapid as evidenced by the fact that the uncured wet strength is, on the average, over 85% of the cured wet strength.

From Table I it will be apparent that the process by which the additives are prepared is capable of giving very high yields both in the polymerization reaction and when the polymer is reacted with epichlorohydrin. The yield of the dichloropropanol by-product in particular is very significantly lower than that found with other commercial processes in which a polyamine is reacted with epichlorohydrin. Finally, it should be noted that the epichlorohydrin conversions are remarkably high indicating very efficient reactant utilization.

From Table II it is apparent that the polymeric additives of the invention have their greatest efficiency at low loadings and this, for many purposes, is a very desirable property.

The above Examples are for the purposes of illustration only and are not intended to imply any limitations on the scope of this invention. It is foreseen that many minor variations could be made in the invention described above without departing from the essential characteristics thereof. It is intended that all such variations shall be included within the purview of this invention.

What is claimed is:

1. A polymeric wet strength additive wherein from 5 to 100% of the recurring units have the formula

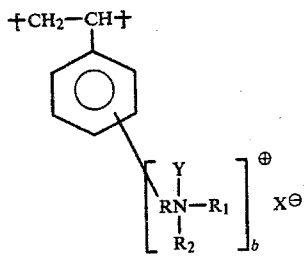

Y is selected from

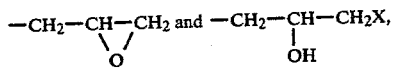

X is a radical derived from water-soluble proton acid, R is a $C_1$ to $C_3$ alkylene group, $R_1$ and $R_2$ are each substituted or unsubstituted $C_1$ to $C_4$ alkyl groups or, taken with the nitrogen together represent a saturated heterocyclic group, and b is an integer from 1 to 3.

2. A polymeric additive according to claim 1 wherein R is a methylene group and $R_1$ and $R_2$ are methyl groups.

3. A polymeric additive according to claim 1 in which b is 1.

4. A polymeric additive according to claim 1 in which $X_1$ is chlorine.

5. A polymeric wet strength additive wherein from 5 to 100% of the recurring units have the formula:

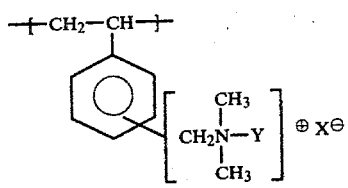

wherein Y is

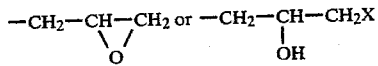

and X is an anion derived from a water-soluble proton acid.

* * * * *